United States Patent [19]

Nakane et al.

[11] Patent Number: 4,983,714

[45] Date of Patent: Jan. 8, 1991

[54] HALOGEN-CONTAINING POLYESTER RESIN COMPOSITION AND COVERED WIRE

[75] Inventors: Toshio Nakane, Fuji; Yukihiko Kageyama, Fujinomiya; Hiroaki Konuma, Shimizu; Kenji Hijikata, Mishima, all of Japan

[73] Assignee: Polyplastics Co., Ltd., Osaka, Japan

[21] Appl. No.: 291,265

[22] Filed: Dec. 28, 1988

[30] Foreign Application Priority Data

Dec. 28, 1987 [JP] Japan .............................. 62-335856

[51] Int. Cl.$^5$ ............................................ C08G 63/02
[52] U.S. Cl. .................................. 528/272; 528/87;
528/106; 528/176; 528/195; 528/299; 528/300;
528/308.6; 528/397; 106/16; 106/18.11;
106/18.24; 428/458; 428/482
[58] Field of Search ............... 528/87, 106, 176, 195,
528/272, 299, 300, 308.6, 397; 106/16, 18.11,
18.24; 428/458, 482

[56] References Cited

U.S. PATENT DOCUMENTS

| | | | |
|---|---|---|---|
| 4,055,606 | 10/1977 | Prevorsek et al. | 525/438 |
| 4,196,066 | 4/1980 | Inata et al. | 204/159.15 |
| 4,271,274 | 6/1981 | Schmidt et al. | 525/111 |
| 4,528,346 | 7/1985 | Sugie et al. | 525/523 |
| 4,803,115 | 2/1989 | Fushiki et al. | 428/285 |

*Primary Examiner*—John Kight, III
*Assistant Examiner*—Sam A. Acquah
*Attorney, Agent, or Firm*—Birch, Stewart, Kolasch & Birch

[57] ABSTRACT

A resin composition useful for coating electrically conductive wires which comprises (A) a halogen containing polyester having a halogen content of 0.5 to 30 wt. % and being a polycondensation product of:

(a) a component composed mainly of an aromatic dicaroxylic acid or an ester forming derivative thereof, (b) a component composed mainly of an aliphatic glycol or an ester forming derivative thereof, and (c) a component composed of an ester forming compound containing a halogen, and (B) 0.1 to 10 wt. %, based on the total composition, of a bisepoxy compound.

12 Claims, No Drawings

HALOGEN-CONTAINING POLYESTER RESIN COMPOSITION AND COVERED WIRE

BACKGROUND OF THE INVENTION

1. Field of the Invention

The present invention relates to a covering material for an electric wire and more particularly to a polyester resin composition comprising a halogen-containing flame retardant aromatic polyester copolymer and a bisepoxy compound incorporated therein. The covering material of the present invention does not suffer any flexibility loss due to thermal history and has excellent flame retardancy. The present invention also relates to an electric wire covered with the same.

2. Prior Art

Rubber, polyvinyl chloride, polyethylene, polypropylene, nylon, etc. have hitherto been used as a wire covering material. In particular, polyvinyl chloride has extensively been used for this application from the viewpoint of flame retardancy and mechanical strengths. In recent years, with an increase in the severity of the environment under which the above-described covering materials are used, requirements for the properties of the covering material including not only excellent thermal resistance and electrical characteristics but also flame retardancy and an excellent thin-wall forming property necessary for realizing space saving have been increased.

Although fluororesin, crosslinked polyethylene, etc., can meet the above-described requirements, they are unsatisfactory in that they are both poor in the thin-wall forming property and the fluororesin is expensive.

Attention has been paid to polyethylene terephthalate and polybutylene terephthalate because they are excellent in the thin-wall forming property as well as in the mechanical strengths (flexibility, abrasion resistance, etc.), thermal resistance, and electrical characteristics. However, these terephthalates are insufficient in the flame retardancy. Further, since they are crystalline resins, the heat history including heating treatment after covering a wire and heating during the use of the covered wire bring about a remarkable lowering in the flexibility thereof. This in turn brings about a lowering in the mechanical strengths such as impact resistance. For this reason, the use of the terephthalates in the vicinity of heat sources and in environments having a danger of heat buildup should be avoided, which more or less impose restrictions on the use of these materials.

In order to overcome the above-described drawbacks, attempts have been made lower the crystallinity even to a small extent by the addition of an elastomer by partial crosslinking for the purpose of maintaining the stability of the mechanical strengths.

The former expedient brings about some improvement, but is disadvantageous in that it is impossible to withstand long-term heat history since the crystalline resin matrix remains as is and, further, the lowering in the proportion of the crystalline resin brings about a lowering in the mechanical properties such as abrasion resistance.

The latter expedient brings about some improvement in the stability of the mechanical strengths, but is disadvantageous in that the flexibility is spoiled and the fabricability is remarkably lowered because of the complexity in controlling the crosslinking reaction.

SUMMARY OF THE INVENTION

In view of the above-described problems, the present inventors have made extensive and intensive studies with a view to developing a covering material for an electric wire which does not suffer any flexibility loss due to thermal history and is flame-retardant and excellent in the mechanical and electrical characteristics. As a result of these studies, the present inventors have found that the addition of a particular compound to a halogen-containing flame retardant aromatic copolyester enables the preparation of the above-described covering material, which has led to the completion of the present invention.

The resin composition of the invention comprises (A) 90 to 99.9 wt. % of a halogen-containing polyester having a halogen content of 0.5 to 30 wt. % and being a polycondensation product of (a) a component comprising mainly of an aromatic dicarboxylic acid or an ester forming derivative thereof, (b) a component comprising mainly of an aliphatic glycol or an ester forming derivative thereof, and (c) a component comprising of an ester forming compound containing a halogen, and (B)

It is very difficult to simultaneously satisfy the characteristic requirements for wire covering material applications, as in the present invention, i.e., various characteristics such as flame retardancy, frictional and abrasion resistance, and flexibility (flexing property and high percentage elongation) and to maintain without causing any flexibility loss due to heat history even when exposed to a heating atmosphere for a long period of time, characteristics of initial high percentage elongation and flexing property. Therefore, it is surprising that a combination of a halogenated copolyester of a polyalkylene terephthalate as component (A) with a bisepoxy compound as component (B) in a certain proportion enables the various characteristics required for a wire covering material to be satisfied, particularly, the addition of an epoxide enables the stability in a long-term exposure to a heating atmosphere to be remarkably improved through the prevention of the flexibility loss due to heat history.

The polyester copolymer composition used in the present invention will now be described in more detail.

At the outset, the components constituting the aromatic polyester copolymer as a base substance of the composition of the present invention will be described. Component (a) is comprised mainly of an aromatic dicarboxylic acid or an ester forming derivative thereof. Representative examples thereof include terephthalic acid and its derivatives. Besides these, other dicarboxylic acids such as isophthalic acid and naphthalenedicarboxylic acid and their derivatives, fatty acids such as adipic acid, sebacic acid, trimellitic acid, and succinic acid and ester forming derivatives thereof, and aromatic hydroxy carboxylic acids such as hydroxybenzoic acid and hydroxynaphthoic acid and ester forming derivatives thereof may be optionally used as an auxiliary.

Next, component (b) constituting the polyester copolymer of the present invention is comprised mainly of an aliphatic diol or an ester forming derivative thereof. A representative substance of component (b) is a low molecular weight glycol having 2 to 8 carbon atoms, and examples thereof include diols such as ethylene glycol, 1,4-butylene glycol, 1,3-propanediol, 1,4-butenediol, 1,6-hexanediol, and 1,8-octanediol. These low molecular weight glycols may be used in combination with high molecular weight glycols, such as polyalkylene oxide glycols, e.g., polyethylene oxide glycol and polybutylene oxide glycol. A combined use of the above-described high molecular weight glycols is very useful for imparting flexibility through an improvement in the elongation of the aromatic polyester constituting the wire covering material of the present invention. Further, aromatic alcohols such as bisphenol A, 4,4'-dihydroxybiphenyl and a phosphinic acid having an aromatic diol group, an adduct of an alcohol with an alkylene oxide such as an adduct of bisphenol A with 2 mol of ethylene oxide and an adduct of bisphenol A with 2 mol of propylene oxide, and polyhydroxy compounds such as glycerin and pentaerythritol or ester forming derivatives thereof may be used as an auxiliary of component (b).

The polyester copolymer constituting the composition of the present invention is an aromatic polyester copolymer having a halogen bonded to its molecule through the use of component (c) comprising a halogen-containing ester forming compound as a monomer. Examples of the halogen-containing compound used for this purpose include the following compounds. The halogen is particularly preferably bromine.

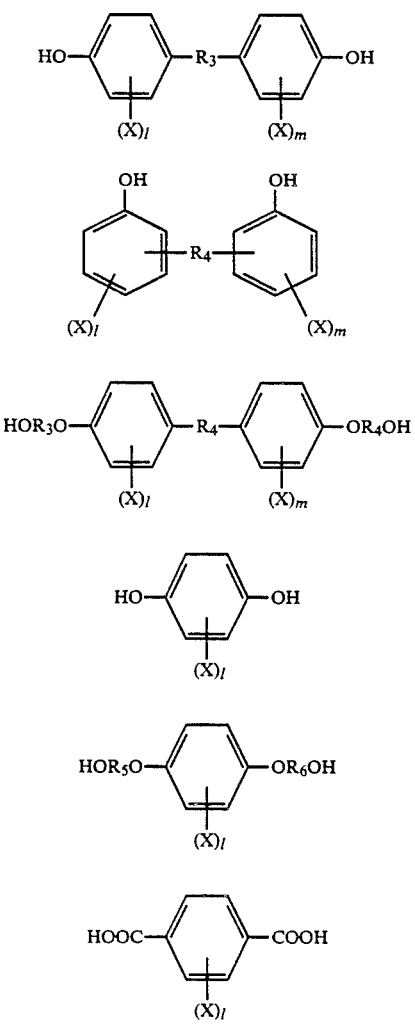

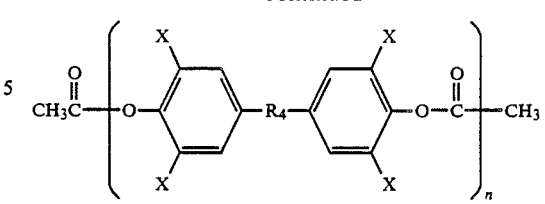

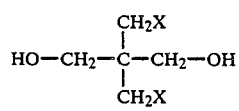

In the above formulae, $R_3$ and $R_4$ are each $-CH_2-$,

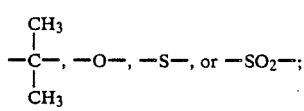

$R_5$ and $R_6$ are each $-C_2H_4-$, $-C_3H_6-$, $-(C_2H_4O)_n-$, or $-(C_3H_6O)_n-$;

X is a halogen;

l and m are each 1 to 4; and n is an integer of 1 or more.

Halogen compounds which are preferable for incorporation as a comonomer are those represented by general formulae 1 to 7, and a halogenated dicarboxylic acid or a halogenated diol having at least 4 halogen atoms per molecule bonded thereto or ester forming derivatives thereof.

When bromine is used as the halogen, examples of the compound represented by general formula 1 include tetrabromobisphenol A and tetrabromobisphenol sulfone, examples of the compound represented by general formula 2 include tetrabromobisphenol F, examples of the compound represented by general formula 3 include an adduct of tetrabromobisphenol A with 2 mol of ethylene oxide, an adduct of tetrabromobisphenol A with 2 mol of propylene oxide, an adduct of tetrabromobisphenol sulfone with 2 mol of ethylene oxide, and an adduct of tetrabromobisphenol sulfone with 2 mol of propylene oxide, examples of the compound represented by general formula 4 include tetrabromohydroquinone examples of the compound represented by general formula 5 include an adduct of tetrabromohydroquinone with 2 mol of ethylene oxide, examples of the compound represented by general formula 6 include tetrabromoterephthalic acid, and examples of the compound represented by general formula 7 include polycarbonate of tetrabromobisphenol A.

It is preferred that the molecular weight of the halogen compound monomer to be incorporated as a comonomer be 390 or more. When the molecular weight is too low, the incorporation of the halogen compound does not contribute to an improvement in the oxygen index serving as a measure of the flame retardancy. Therefore, it is preferred that the halogen compound contain at least one aromatic ring in its molecule.

These halogen compounds are added so that the halogen content of the resultant copolyester be 0.5 to 30% by weight, preferably 2 to 20% by weight. When the halogen content is less than 0.5% by weight, no sufficient flame retardancy can be attained, while when it exceeds 30% by weight, the mechanical properties are unfavorably lowered.

With respect to the proportion of the monomers for preparation of a polyester copolymer used in the present invention, it is preferred that when the ester forming functional group of the halogen compound as component (c) is alcoholic, the total amount of components (b) and (c) be 90 to 200 mol, preferably 95 to 150 mol based on 100 mol of component (a). On the other hand, when the ester forming functional group of the halogen compound as component (c) is carboxylic, the amount of component (b) is 90 to 200 mol, preferably 95 to 150 mol based on 100 mol of the total amount of components (a) and (c).

When a covering material having a high oxygen index is necessary depending upon service conditions, a covering material satisfying the index requirement can be prepared by adjusting the halogen content of the copolymer through proper determination of the content of component (c).

The copolymer used in the present invention can be prepared by polymerization through conventional processes such as solution polymerization, interfacial polymerization, and solid phase polymerization and has an intrinsic viscosity of about 0.5 to 3.0.

The composition of the present invention is characterized in that a particular amount of the following bisepoxy compound as component (B) is incorporated in the above-described halogen-containing polyester copolymer.

The bisepoxy compound as component (B) is preferably one represented by following general formula (1):

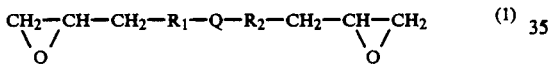

wherein $R_1$ and $R_2$ are each a group selected from among

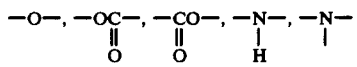

and Q is a divalent organic group.

Examples of the divalent organic group —Q— in general formula (1) include groups represented by the following formulae:

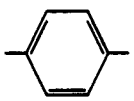

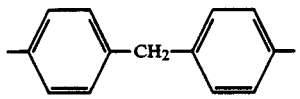

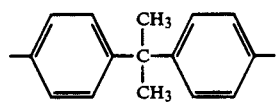

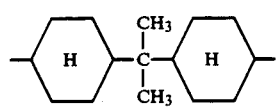

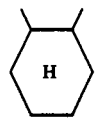

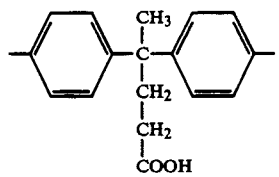

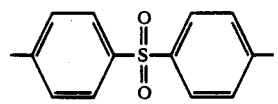

Among the groups represented by formulae (2) to (8), those represented by formulae (2), (3), (4), and (8) are preferable in the present invention.

Examples of the group represented by formula (2) include diglycidyl terephthalate, hydroquinone diglycidyl ether, and glycidyl p-glycidyloxybenzoate, examples of the group represented by formula (3) include bisphenol F diglycidyl ether, examples of the group represented by formula (4) include bisphenol A diglycidyl ether, and examples of the group represented by formula (5) include bisphenol sulfone diglycidyl ether.

Although these compounds can be prepared by ordinary processes, they can be more easily prepared by reacting various carboxylic acid derivatives or alcohols with glycidyl alcohol, epichlorohydrin, or the like.

The bisepoxy compound as component (B) is added in an amount of 0.1 to 10% by weight, preferably 0.1 to 5% by weight based on the total amount of the composition. When the amount is too small, no intended effect can be attained, while when it is too large, there occur problems such as a remarkable increase in the viscosity and an increase in the amount of decomposition products.

The bisepoxy compound as component (B) may be added in preparing the above-described aromatic copolyester, or alternatively it may be added and mixed during the preparation of pellets.

Further, a catalyst such as a tertiary amine compound or a phosphate may be added for the purpose of improving the reactivity of the epoxy group.

Although the composition used in the present invention exhibits excellent performances even when no additive is used, if necessary, stabilizers such as antioxidants and ultraviolet absorbers, antistatic agents, flame retardants, flame retardant aid, colorants such as dyes and pigments, lubricants and lubricating agents for improving flowability and releasability, crystallization promoters (nucleating agents), inorganic materials, etc., may be used for the purpose of further improving the performances. In particular, when an antioxidant is added in combination with a bisepoxy compound, a further improved effect can be attained.

Hindered phenol, amine and phosphorus compounds, etc., may be used as the stabilizer.

Examples of the hindered phenol include 2,2'-methylenebis(4-methyl-6-tert-butylphenol), hexamethylene glycol bis (3,5-di-tert-butyl-4-hydroxyhydrocinnamate), tetrakis[methylene(3,5-di-tert-butyl-4-hydrpoxyhydrocinnamate)]methane, triethylene glycol bis-3-(3tert-butyl-4-hydroxy-5-methylphenyl)proponate, 1,3,5-trimethyl-2,4,6-tris(3,5-di-tert-butyl-4-hydroxybenzyl)benzene, n-octadecyl 3-(4'-hydroxy-3',5'-di-tert-butylphenyl)propionate, 4,4'-methylenebis(2,6-di-tert-butylphenol), 4,4'-butylidenebis(6-tert-butyl-3-methylphenol), 2,2'-thiodiethyl bis[3[(3,5-di-tert-butyl-4-hydroxyphenol)propionate], distearyl 3,5-tert-butyl-4-hydroxybenzylphosphonate, and 2-tert-butyl-6-(3-tert-butyl-5-methyl-2-hydroxybenzyl)-4-methylphenyl acrylate, and at least one of them may be used. Among them, hexamethylene glycol bis(3,5-di-tert-butyl-4-hydroxyhydrocinnamate), tetrakis[methylene(3,5-di-tert-butyl-4-hydroxyhydrocinnamate)]methane, and triethylene glycol bis-3-(3-tert-butyl-4-hydroxy-5-methylphenyl)propionate are particularly preferable substances.

Examples of the amine compound include N-phenyl-N'-isopropyl-p-phenylenediamine, N'N'-diphenyl-p-phenylenediamine, 4,4'-bis(4-α,α-dimethylbenzyl)-diphenylamine, a product of a condensation reaction of diphenylamine with acetone, N-phenylnaphthylamine, and N,N'-β-naphthylphenylenediamine.

Examples of the phosphorus compound include a phosphonite compound represented by the following general formula (9):

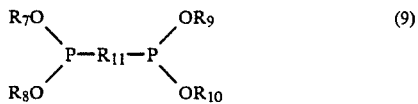

In the formula, $R_7$, $R_8$, $R_9$, and $R_{10}$ which may be the same or different are each an alkyl group having 1 to 25 carbon atoms, a substituted alkyl group, an aryl group, or a substituted aryl group. Examples of the group include methyl, ethyl, butyl, octyl, decyl, lauryl, tridecyl, stearyl, phenyl, and alkyl- and/or alkoxy-substituted phenyl groups. $R_{11}$ is an alkylene group having 4 to 33 carbon atoms, a substituted alkylene group, an arylene group or a substituted arylene group, and examples thereof include butylene, octylene, phenylene, naphthylene, and diphenylene groups and a group represented by the following formula:

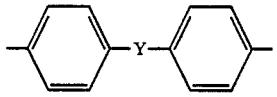

wherein Y is an oxy, sulfonyl, carbonyl, methylene, ethylidene, butylidene, isopropylene, or diazo group. A particularly preferred phosphonite compound is tetrakis(2,4-di-tert-butylphenyl) 4,4'-diphenylenephosphonite.

The amount of addition of the phosphorus compound is 0.01 to 5% by weight, preferably 0.1 to 3% by weight based on the total amount of the composition.

Examples of the flame retardant aid include antimony compounds such as antimony trioxide and antimony halide, metallic compounds containing zinc and bismuth, magnesium hydroxide, clay silicates such as asbestos, and halogen-containing polymers such as brominated polycarbonate and brominated epoxy resin.

Examples of the inorganic material include ordinary inorganic fibers such as glass fibers, ceramic fibers, boron fibers, potassium titanate fibers, and asbestos, particulate materials such as calcium carbonate, highly dispersible silicate, alumina, aluminum hydroxide, talc, clay, mica, glass flake, glass powder, glass bead, quartz powder, quartz sand, wollastonite, carbon black, barium sulfate, plaster of paris, silicon carbide, alumina, boron nitrite, and silicon nitrite, flaky inorganic compounds, and whisker.

These inorganic fillers may be used alone or in combination of two or more of them.

At least one organic polymeric material can be used as an auxiliary for the purpose of improving drape in melt extrusion, lubricity, and flexibility. Examples of the organic polymeric material include polyesters other than those mentioned above, polyamides, polyolefins and their copolymers, low molecular weight polyethylene, polycarbonate, polyurethane, butyl rubber, rubber-like polymeric materials such as ABS, multi-phase copolymers, thermoplastic segment type copolyesters (including graft copolymers), etc.

The electric wire of the present invention is prepared by known processes. In general, a travelling conductor is covered with a covering material by melt extrusion. In this case, there are two methods of covering the wire with the covering material, i.e., a method in which the direction of travel of the conductor is even with the direction of extrusion and a method in which a cross head having a constant angle is used. The electric wire of the present invention can be prepared by either method.

The extruder is preferably a screw extruder because the flow rate of the covering material can be easily controlled thereby.

The unevenness of the thickness of the covering material is detected by known methods with X ray, ultrasonic wave, etc.

The eccentricity due to an uneven thickness is expressed by concentricity $e_c$. A larger value of $e_c$ represents better results The $e_c$ value is preferably 65% or more, more preferably 70% or more.

$$e_c = \frac{e_{min}}{e_{max}} \times 100$$

wherein
$e_{min}$: minimum thickness of covered section
$e_{max}$: maximum thickness of covered section The unevenness of the thickness can be regulated by a method which comprises detecting the unevenness with an uneven thickness detector and automatically or manually adjusting the clearance between the die and the detector at the central portion of a screw extruder and a method in which the flow rate of the covering material is controlled together with pressure and temperature.

The use of a concentric head is also effective in reducing the unevenness of the thickness.

In preparing the electric wire of the present invention, if necessary, the covering material may be passed through a heating zone after application and shaping of the covering material for the purpose of further increasing the mechanical strengths. The temperature of the heating zone is below the melting point and above the glass transition temperature of the covering material.

EFFECT OF THE INVENTION

The halogen-containing resin composition of the present invention exhibits a remarkable improvement in preventing the lowering in the physical properties attributed to heat history over that of the conventional polyester covering material, which brings about the following excellent effects.

(1) The covering material is excellent in the flame retardancy and less susceptible to the lowering in the physical properties attributed to heat history, which renders the covering material suitable for use in electric wires used in the vicinity of heat sources, engines of transports, heat buildup parts of electric appliances.

(2) It is possible to reduce the thickness of the covering material without spoiling the mechanical and electrical characteristics and also to attain excellent flexing property, so that a remarkable increase can be attained with respect to effective utilization of a limited space. This renders the covering material useful for wire applications where information is highly integrated and there is a limitation on the space capacity, e.g., transports such as space rockets, airplanes, and automobiles, electric appliances, computers, and information-related devices.

(3) Since a halogen compound is incorporated into a copolymer, the covering material causes no oozing at high temperatures as opposed to the case of mere addition of a flame retardant, which enables not only the attainment of an excellent appearance but also a lowering in the covering cost because blocking between the electric wires themselves can be prevented during preparation of a covered wire.

By virtue of the above-described features, the covering material according to the present invention not only can be used for electric wires in the field of transports, electric, electronic and information-related devices, various machines, etc. but also is suitable for use in materials for various apparatuses and parts which are required to have such properties as well.

EXAMPLES

The present invention will now be described with reference to the following Examples. Copolymers P, Q, and R used in these Examples were prepared as follows.

Preparation Example 1 (preparation of copolymer P)

A reactor equipped with an agitator, a nitrogen inlet tube and a distilling tube was charged with 970 parts by weight of dimethyl terephthalate, 513 parts by weight of 1,4-butanediol, 158 parts by weight of an adduct of tetrabromobisphenol A with 2 mol of ethylene oxide, and 0.7 part by weight of tetrabutoxytitanium. The mixture was agitated in a stream of nitrogen at 160° C. for 30 min. The temperature was gradually raised to heat the mixture at a temperature ranging from 200 to 270° C. for 2 hr. Then, the supply of nitrogen was stopped. The reactor was gradually evacuated so that the pressure was lowered to 0.3 mmHg 30 min after the initiation of the evacuation. The reaction mixture was agitated for 3 hr under this pressure. The polymer thus prepared had an intrinsic viscosity of 1.0 and a bromine content of 6.5% by weight.

Preparation Example 2 (preparation of copolymer Q)

A reactor equipped with an agitator, a nitrogen inlet tube and a distilling tube was charged with 970 parts by weight of dimethyl terephthalate, 513 parts by weight of 1,4-butanediol, 171 parts by weight of an adduct of tetrabromobisphenol sulfone with 2 mol of propylene oxide, and 0.7 part by weight of tetrabutoxytitanium. The mixture was agitated in a stream of nitrogen at 160° C. for 30 min. The temperature was gradually raised to heat the mixture at a temperature ranging from 200° to 270° C. for 2 hr. Then, the supply of nitrogen was stopped. The reactor was gradually evacuated so that the pressure was lowered to 0.3 mmHg 30 min after the initiation of the evacuation. The reaction mixture was agitated at 270° C. for 3 hr under this pressure. The polymer thus prepared had an intrinsic viscosity of 1.1 and a bromine content of 6.3% by weight.

Preparation Example 3 (preparation of copolymer R)

A reactor equipped with an agitator, a nitrogen inlet tube and a distilling tube was charged with 900 parts by weight of dimethyl terephthalate, 450 parts by weight of 1,4-butanediol, 50 parts by weight of polybutylene oxide glycol having an average molecular weight of 400, 158 parts by weight of an adduct of tetrabromobisphenol A with 2 mol of ethylene oxide, and 0.7 part by weight of tetrabutoxytitanium. The mixture was agitated in a stream of nitrogen at 180° C. for 30 min. The temperature was gradually raised to heat the mixture at a temperature ranging from 200° to 270° C. for 3 hr. Thereafter, the supply of nitrogen was stopped, and the reactor was gradually evacuated so that the pressure was lowered to 0.5 mmHg 15 min after the initiation of the evacuation. The reaction mixture was agitated for 6 hr under this pressure. The polymer thus prepared had an intrinsic viscosity of 1.0 and a bromine content of 6.3% by weight.

EXAMPLE 1

98.5 parts by weight of copolymer P was mixed in powdery form with 1.5 parts by weight of bisphenol A diglycidyl ether (hereinafer abbreviated to "BPADGE"). The mixture was molten and homogeneously mixed by making use of an ordinary extruder to prepare pellets. A specimen was prepared from the resultant pellets by making use of an injection molding machine according to an ordinary method and subjected to evaluation of the physical properties.

The individual physical properties were measured by the following methods.

The tensile strength and percentage elongation (%) were measured according to ASTM D 638. The dielectric breakdown was measured by the short time method according to ASTM D 149, while the dielectric constant was measured according to DISO 1 kHz. The flame retardancy was evaluated as O when a flame went out within 30 sec in a test according to UL-94V and as X when the flame did not go out within 30 sec. The oxygen index was measured according to JIS K 7201. The surface configuration was evaluated as X when abnormal phenomena, such as bleeding or blistering, were observed in the surface after the specimen was allowed to stand at 120° C. for 72 hr and evaluated as O when no abnormal phenomenon was observed.

A specimen for the tensile test was stored in a thermostatic chamber of 120° C., and the percentage elongation and retention of elongation were measured 500 hr after the initiation of the storage in the same manner as that described above.

Further, a circular compact-stranded copper wire having an outer diameter of 1.9 mm was covered with a resin composition so as to have a wall thickness of 0.3 mm, thereby preparing an electric wire. The wire was stored in a thermostatic chamber of 120° C. 500 hr after the initiation of the storage, the wire was folded down 10 times at an angle of 90°, and the surface state of the wire was then examined to evaluate the flexing property. The flexibility of the wire was evaluated as X when cracking and fine cracking occurred and as O when no abnormal phenomenon occurred.

The results are shown in Table 1.

EXAMPLE 2

COMPARATIVE EXAMPLES 1 to 6

The evaluation of a resin composition was conducted in the same manner as that of Example 1, except that no bisepoxy compound was incorporated and the copolymers and the resin compositions used herein were those shown in Table 1. The results are shown in Table 1.

TABLE 1

|  |  | Examples | | | | | | | | |
|---|---|---|---|---|---|---|---|---|---|---|
|  |  | 1 | 2 | 3 | 4 | 5 | 6 | 7 | 8 | 9 |
| resin composition | resin used (pts. wt.) | P 98.5 | P 98.5 | Q 98.5 | Q 98.5 | R 98.5 | R 98.5 | P 98.5 | Q 98.5 | R 98.5 |
|  | bisepoxy BPADGE (pts. wt.) | 1.5 | — | 1.5 | — | 1.5 | — | 1.5 | 1.5 | 1.5 |
|  | compound BPSDGE (pts. wt.) | — | 1.5 | — | 1.5 | — | 1.5 | — | — | — |
|  | flame retardant (pts. wt.) | — | — | — | — | — | — | — | — | — |
|  | stabilizer (pts. wt.) | — | — | — | — | — | — | 1.0 | 1.0 | 1.0 |
| dielectric breakdown (kV/mm) | | 16 | 16 | 16 | 16 | 16 | 16 | 16 | 16 | 16 |
| dielectric constant | | 3.1 | 3.2 | 3.1 | 3.2 | 3.2 | 3.2 | 3.1 | 3.2 | 3.2 |
| flame retardancy | | O | O | O | O | O | O | O | O | O |
| oxygen index | | 27 | 27 | 27 | 27 | 27 | 27 | 27 | 27 | 27 |
| surface configuration | | O | O | O | O | O | O | O | O | O |
| tensile strength (kg/cm²) | | 565 | 580 | 564 | 576 | 565 | 575 | 569 | 564 | 564 |
| elongation (%) | | 300< | 300< | 300< | 300< | 300< | 300< | 300< | 300< | 300< |
| after 500 hr at 120° C. | elongation (%) | 248 | 235 | 240 | 238 | 255 | 260 | 248 | 260 | 244 |
|  | flexing property | O | O | O | O | O | O | O | O | O |

|  |  | Examples | | | Comparative Examples | | | | | |
|---|---|---|---|---|---|---|---|---|---|---|
|  |  | 10 | 11 | 12 | 1 | 2 | 3 | 4 | 5 | 6 |
| resin composition | resin used (pts. wt.) | P 99.7 | P 96 | P 90 | P 100 | Q 100 | R 100 | P 99 | Q 99 | R 99 |
|  | bisepoxy BPADGE (pts. wt.) | 0.3 | 4 | 10 | — | — | — | — | — | — |
|  | compound BPSDGE (pts. wt.) | — | — | — | — | — | — | — | — | — |
|  | flame retardant (pts. wt.) | — | — | — | — | — | — | — | — | — |
|  | stabilizer (pts. wt.) | — | — | — | — | — | — | 1.0 | 1.0 | 1.0 |
| dielectric breakdown (kV/mm) | | 17 | 17 | 16 | 17 | 17 | 17 | 17 | 17 | 17 |
| dielectric constant | | 3.2 | 3.2 | 3.2 | 3.2 | 3.2 | 3.3 | 3.2 | 3.2 | 3.3 |
| flame retardancy | | O | O | O | O | O | O | O | O | O |
| oxygen index | | 27 | 27 | 27 | 27 | 27 | 27 | 27 | 27 | 27 |
| surface configuration | | O | O | O | O | O | O | O | O | O |
| tensile strength (kg/cm²) | | 570 | 558 | 526 | 543 | 550 | 450 | 543 | 550 | 451 |
| elongation (%) | | 300< | 300< | 245 | 300< | 300< | 300< | 300< | 300< | 300< |
| after 500 hr at 120° C. | elongation (%) | 232 | 228 | 195 | 77 | 79 | 110 | 102 | 114 | 148 |
|  | flexing property | O | O | O | X | X | X | X | X | X |

98.5 parts by weight of copolymer P was mixed in powdery form with 1.5 parts by weight of bisphenol sulfone diglycidyl ether (hereinafter abbreviated to "BPSDGE"). The mixture was molten and homogeneously mixed by making use of an ordinary extruder to prepare pellets. The resultant resin composition was evaluated in the same manner as that of Example 1. The results are shown in Table 1.

EXAMPLES 3 to 6

The evaluation of the resin composition was conducted in the same manner as that of Examples 1 and 2, except that the copolymers used herein were copolymers Q and R. The results are shown in Table 1.

EXAMPLES 7 to 9

Triethylene glycol bis[3-(3-tert-butyl-5-methyl-4-hydroxyphenyl)propionate](IRGAVOX ®245) was added as an antioxidant to each resin of Examples 1, 3, and 5 in an amount of 1.0 part by weight based on 100 parts by weight of the resin. Each resin composition thus prepared was evaluated in the same manner as that of Example 1. The results are shown in Table 1.

EXAMPLES 10 to 12

The evaluation of a resin composition was conducted in the same manner as that of Example 1, except that the resin compositions used herein were those shown in Table 1. The results are shown in Table 1.

We claim:
1. A halogen-containing polyester resin composition on consisting essentially of:
   (A) a flame retardant aromatic polymer copolymer having a halogen content of 0.5 to 30 wt. % and prepared by polycondensation of:
      (a) a component comprising mainly of an aromatic dicarboxylic acid or an ester forming derivative thereof:
      (b) a component comprising mainly of an aliphatic glycol or an ester forming derivative thereof, and
      (c) a component comprising an ester forming compound containing a halogen; and, incorporated therein,
   (B) a bisepoxy compound in an amount of 0.1 to 10% by weight based on the total amount of the composition.

2. The resin composition according to claim 1, wherein said aliphatic glycol of component (b) is a low molecular weight glycol having 2 to 8 carbon atoms.

3. The resin composition according to claim 1, wherein said aliphatic glycol of component (b) is a low molecular weight glycol having 2 to 8 carbon atoms and a polyalkylene oxide glycol having a molecular weight of 200 to 4000.

4. The resin composition according to claim 2, wherein said low molecular weight glycol having 2 to 8 carbon atoms is at least one member selected from the group consisting of ethylene glycol, 1,4-butylene glycol, and 1,4-butene glycol.

5. The resin composition according to claim 1, wherein said halogen-containing ester forming compound of component (c) is a halogenated dicarboxylic acid or a halogenated glycol and derivatives thereof.

6. The resin composition according to claim 1, wherein said halogen-containing ester forming compound of component (c) has 4 or more carbon atoms per molecule.

7. The resin composition according to claim 1, wherein said halogen of the ester forming compound of component (c) is bromine.

8. The resin composition according to any one of claims 1 to 7, wherein said bisepoxy compound (B) is a compound represented by following general formula (1):

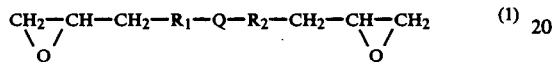 (1)

wherein $R_1$ and $R_2$ are each a group selected from the group consisting of

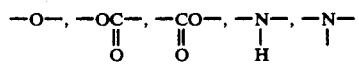

and Q is a divalent organic group.

9. The resin composition according to claim 1, which further comprises 0.1 to 3% by weight of a stabilizer based on the total amount of the composition.

10. An electric wire comprising a conductive wire in which the surface thereof is covered with a covering material which comprises a halogen-containing polyester resin composition consisting essentially of:
(A) a flame retardant aromatic polyester copolymer having a halogen content of 0.5 to 30 wt % and prepared by polycondensation of:
   (a) a component comprising mainly of an aromatic dicarbocxylic acid or and ester forming derivative thereof,
   (b) a component comprising mainly of an aliphatic glycol or an ester forming derivative thereof, and
   (c) a component comprising an ester forming compound containing a halogen; and, incorporated therein,
(B) a bisepoxy compound in an amount of 0.1 to 10% by weight based on the total amount of the composition.

11. The electric wire according to claim 10, wherein said halogen of the ester forming compound of component (c) is bromine.

12. The electric wire according to claim 10 or 11 wherein said electric wire is low-tension electric wire.

* * * * *